US009679438B2

(12) United States Patent
Burgess

(10) Patent No.: US 9,679,438 B2
(45) Date of Patent: Jun. 13, 2017

(54) BONUS SYSTEM, A BONUS CONTROLLER AND A METHOD OF MAKING A BONUS AWARD

(71) Applicant: Aristocrat Technologies Australia Pty Limited, North Ryde (AU)

(72) Inventor: Russell Burgess, Henderson, NY (US)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 327 days.

(21) Appl. No.: 13/929,059

(22) Filed: Jun. 27, 2013

(65) Prior Publication Data

US 2014/0004927 A1 Jan. 2, 2014

Related U.S. Application Data

(60) Provisional application No. 61/664,843, filed on Jun. 27, 2012.

(51) Int. Cl.
*G06F 17/00* (2006.01)
*G07F 17/32* (2006.01)

(52) U.S. Cl.
CPC ................................ *G07F 17/3244* (2013.01)

(58) Field of Classification Search
CPC .................................................. G07F 17/3244
See application file for complete search history.

(56) References Cited

U.S. PATENT DOCUMENTS

| | | | |
|---|---|---|---|
| 7,731,199 B2 | 6/2010 | Fukazawa et al. | |
| 7,731,587 B2 | 6/2010 | Kumagai | |
| 2003/0130039 A1* | 7/2003 | Nelson ............................ | 463/42 |
| 2009/0124366 A1* | 5/2009 | Aoki et al. ...................... | 463/27 |

FOREIGN PATENT DOCUMENTS

| | | |
|---|---|---|
| CN | 201120118 | 9/2008 |
| JP | 2007209398 | 8/2007 |
| JP | 2008148815 | 7/2008 |
| JP | 2008149200 | 7/2008 |
| JP | 2008167245 | 7/2008 |
| JP | 2008237815 | 10/2008 |
| JP | 2009072449 | 4/2009 |
| JP | 2009165691 | 7/2009 |
| JP | 2009226073 | 10/2009 |
| JP | 2009233337 | 10/2009 |
| JP | 2010094492 | 4/2010 |
| JP | 2010131449 | 6/2010 |
| JP | 2010201232 | 9/2010 |
| WO | 2007/030675 | 3/2007 |

* cited by examiner

*Primary Examiner* — Kang Hu
*Assistant Examiner* — Thomas H Henry
(74) *Attorney, Agent, or Firm* — Armstrong Teasdale LLP

(57) ABSTRACT

Gaming systems, controllers, and associated methods are provided. An example bonus system for a gaming venue includes a memory storing layout data representative of a two-dimensional positional layout of a plurality of gaming devices within the gaming venue. The example bonus system includes a bonus controller arranged to: determine that a triggering event has occurred with respect to a triggering gaming device of the plurality of gaming devices; determine based on the layout data whether any eligible gaming devices of the plurality of gaming devices are within a defined physical proximity of the position of the triggering device within the two-dimensional positional layout; and make a bonus award in respect of each eligible gaming device.

19 Claims, 9 Drawing Sheets

Casino Floor (Award Shown)

Casino Floor (Award Shown)

BONUS SYSTEM, A BONUS CONTROLLER AND A METHOD OF MAKING A BONUS AWARD

CROSS-REFERENCE TO RELATED APPLICATIONS

The present application claims the benefit of priority to U.S Provisional Patent Application No. 61/664,843, filed on Jun. 27, 2012, entitled "A BONUS SYSTEM, A BONUS CONTROLLER AND A METHOD OF MAKING A BONUS AWARD", which is herein incorporated by reference in its entirety.

FIELD

The present invention relates to a bonus system, a bonus controller and a method of making a bonus award in respect of a gaming device at a gaming venue with a bonus controller.

BACKGROUND

Bonus systems are known which may make an additional bonus award to a player of one of the gaming machines at a gaming venue in response to a triggering event. While such bonus systems provide players with enjoyment, a need exists for alternative bonus systems in order to maintain or increase player enjoyment.

BRIEF SUMMARY

In a first aspect, certain embodiments of the invention provide a bonus system for a gaming venue, the bonus system including:

a memory storing layout data representative of a two-dimensional positional layout of a plurality of gaming devices within the gaming venue; and a bonus controller arranged to:

determine that a triggering event has occurred with respect to a triggering gaming device of the plurality of gaming devices;

determine based on the layout data whether any eligible gaming devices of the plurality of gaming devices are within a defined physical proximity of the position of the triggering device within the two-dimensional positional layout; and make a bonus award in respect of each eligible gaming device.

In an embodiment, the defined physical proximity is a radial proximity.

In an embodiment, the bonus controller is arranged to determine one or more award zones relative to the triggering device and to make an award to each eligible gaming device within the one or more award zones.

In an embodiment, there are a plurality of award zones and the relative size of awards made in respect of eligible gaming devices within award zones closer is based on proximity of the award zones to the triggering gaming device.

In an embodiment, the greatest award is made in respect of the eligible gaming devices in a closest zone relative to the triggering gaming device and the smallest award is made in respect of the eligible gaming devices in a furthest zone relative to the triggering gaming device.

In an embodiment, the bonus controller is arranged to make an award to an eligible triggering device, and the bonus controller deciding to make the award constitutes the triggering event.

In an embodiment, only eligible gaming devices can be triggering gaming devices.

In an embodiment, the bonus controller is arranged to determine which of the plurality of gaming devices are eligible based on one or more eligibility criteria.

In an embodiment, an eligibility criteria is that a respective gaming device was active within a defined period relative to the triggering event.

In an embodiment, an eligibility criteria is that a player tracking system is tracking play in respect of a respective gaming device.

In a second aspect, certain embodiments of the invention provide a bonus controller for a gaming venue, the bonus controller arranged to:

determine that a triggering event has occurred with respect to a triggering gaming device of a plurality of gaming devices disposed within the gaming venue;

determine based on layout data a representative of a two-dimensional positional layout of the plurality of gaming devices within the gaming venue, whether any eligible gaming devices of the plurality of gaming devices are within a defined physical proximity of the position of the triggering device within the two-dimensional positional layout; and make a bonus award in respect of each eligible gaming device.

In an embodiment, the defined physical proximity is a radial proximity.

In an embodiment, the bonus controller is arranged to determine one or more award zones relative to the triggering device and to make an award to each eligible gaming device within the one or more award zones.

In an embodiment, there are a plurality of award zones and the relative size of awards made in respect of eligible gaming devices within award zones closer is based on proximity of the award zones to the triggering gaming device.

In an embodiment, the greatest award is made in respect of the eligible gaming devices in a closest zone relative to the triggering gaming device and the smallest award is made in respect of the eligible gaming devices in a furthest zone relative to the triggering gaming device.

In an embodiment, the bonus controller is arranged to make an award to an eligible triggering device, and the bonus controller deciding to make the award constitutes the triggering event.

In an embodiment, only eligible gaming devices can be triggering gaming devices.

In an embodiment, the bonus controller is arranged to determine which of the plurality of gaming devices are eligible based on one or more eligibility criteria.

In an embodiment, an eligibility criteria is that a respective gaming device was active within a defined period relative to the triggering event.

In an embodiment, an eligibility criteria is that a player tracking system is tracking play in respect of a respective gaming device.

In a third aspect, certain embodiments of the invention provide a method of making a bonus award in respect of a gaming device at a gaming venue with a bonus controller, the method including:

determining, with the bonus controller, that a triggering event has occurred with respect to a triggering gaming device of a plurality of gaming devices disposed within the gaming venue;

determining, with the bonus controller, based on layout data representative of a two-dimensional positional layout of the plurality of gaming devices within the gaming venue, whether any eligible gaming devices of the plurality of gaming devices are within a defined physical proximity of the position of the triggering device within the two-dimensional positional layout; and making, with the bonus controller, a bonus award in respect of each eligible gaming device.

In an embodiment, the defined physical proximity is a radial proximity.

In an embodiment, the method includes determining one or more award zones relative to the triggering device and making an award to each eligible gaming device within the one or more award zones.

In an embodiment, there are a plurality of award zones and the relative size of awards made in respect of eligible gaming devices within award zones closer is based on proximity of the award zones to the triggering gaming device.

In an embodiment, the greatest award is made in respect of the eligible gaming devices in a closest zone relative to the triggering gaming device and the smallest award is made in respect of the eligible gaming devices in a furthest zone relative to the triggering gaming device.

In an embodiment, the method includes making an award to an eligible triggering device, and the bonus controller deciding to make the award constitutes the triggering event.

In an embodiment, only eligible gaming devices can be triggering gaming devices.

In an embodiment, the method includes determining which of the plurality of gaming devices are eligible based on one or more eligibility criteria.

In an embodiment, an eligibility criteria is that a respective gaming device was active within a defined period relative to the triggering event.

In an embodiment, an eligibility criteria is that a player tracking system is tracking play in respect of a respective gaming device.

In a fourth aspect, certain embodiments of the invention provide computer program code for implementing the above method.

In a fifth aspect, certain embodiments of the invention provide a tangible computer readable medium including program code for implementing the above method.

BRIEF DESCRIPTION OF DRAWINGS

Features and advantages of the present invention will become apparent from the following description of embodiments thereof, by way of example only, with reference to the accompanying drawings, in which.

Figure 1:
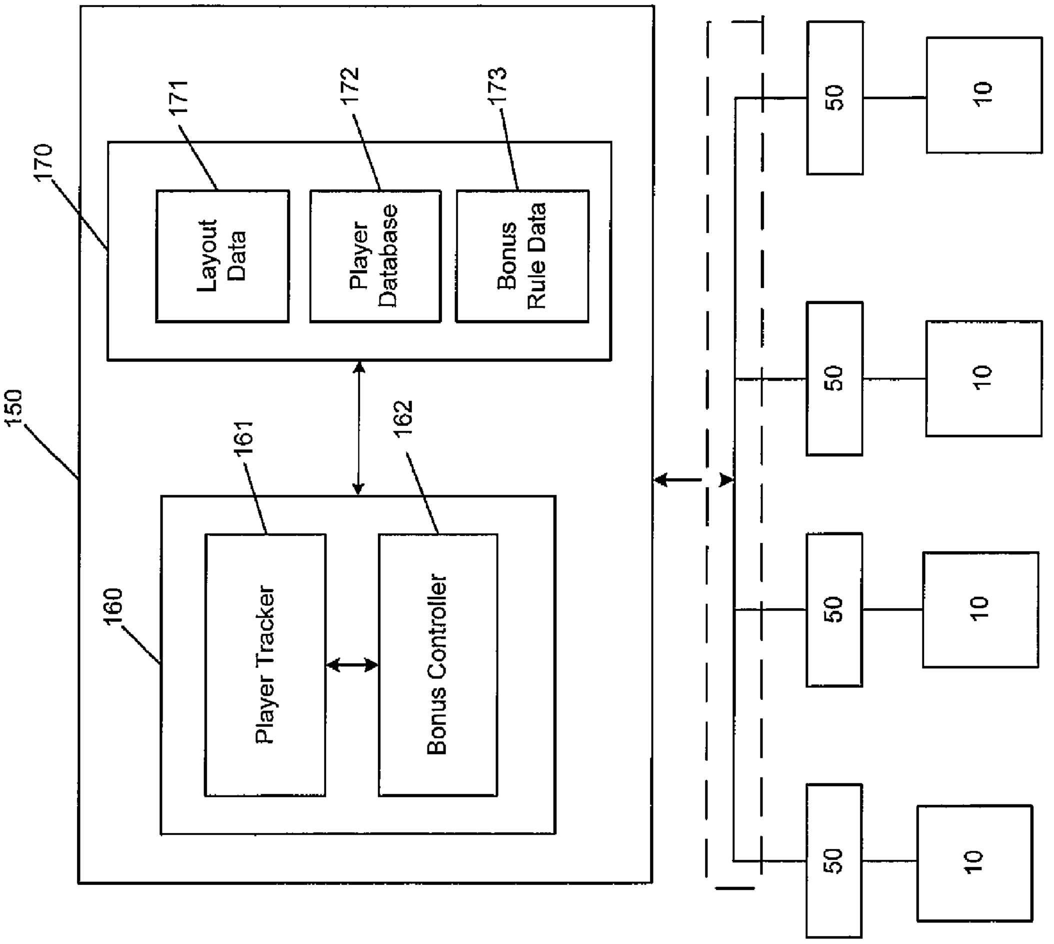
FIG. 1 is a block diagram of a gaming system for a gaming venue with a player tracking system incorporating a bonus controller.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, Blu-ray, etc., storing the software and/or firmware.

Overview of Exemplary Gaming System

FIG. 1 shows an example gaming system 1 where a player tracking system 150 is in data communication over a network 2, such as an Ethernet, with a bank of four gaming devices in the form of standalone gaming machines 10. Each gaming system has an associated player tracking module 50 adapted to communicate with the player tracking system 150. The player tracking module 50 is arranged to read information from a player card, for example employing a magnetic stripe reader or an RFID reader depending on the type of card employed. A player identifier is reported to the player tracking system 150. The player tracking system has a player tracker 161 implemented by processor 160 executing player tracking software stored in the memory 170 in accordance with techniques know in the art. For example, by employing the Sentinel system provided by Aristocrat Technologies Australia Pty Ltd. As is known in the art, the player tracker 161 receives reporting information from the PTM 50 indicative of activity on the gaming machine 10, for example: amount wagered, number of games played, amount won, etc. Player tracker 161 updates a relevant player record in player database 172 based on the activity. As is known in the art, the player activity may result in the accumulation of loyalty points that may be redeemed for goods or services at later dates.

As will be described in further detail below, the bonus controller is arranged to respond to trigger conditions arising from player tracking by the player tracker to make bonus awards. In the embodiment, a trigger condition results in an initial award being made to one of the gaming devices 10 (a "trigger gaming device") and further awards being made to eligible ones of the plurality of gaming devices 10 within the venue based on their physical proximity to the triggering.

Gaming Devices

Gaming devices capable of participating in the method of gaming and bonus system of the embodiment can take any suitable form including stand alone gaming machines and server based gaming terminals.

Figure 2:
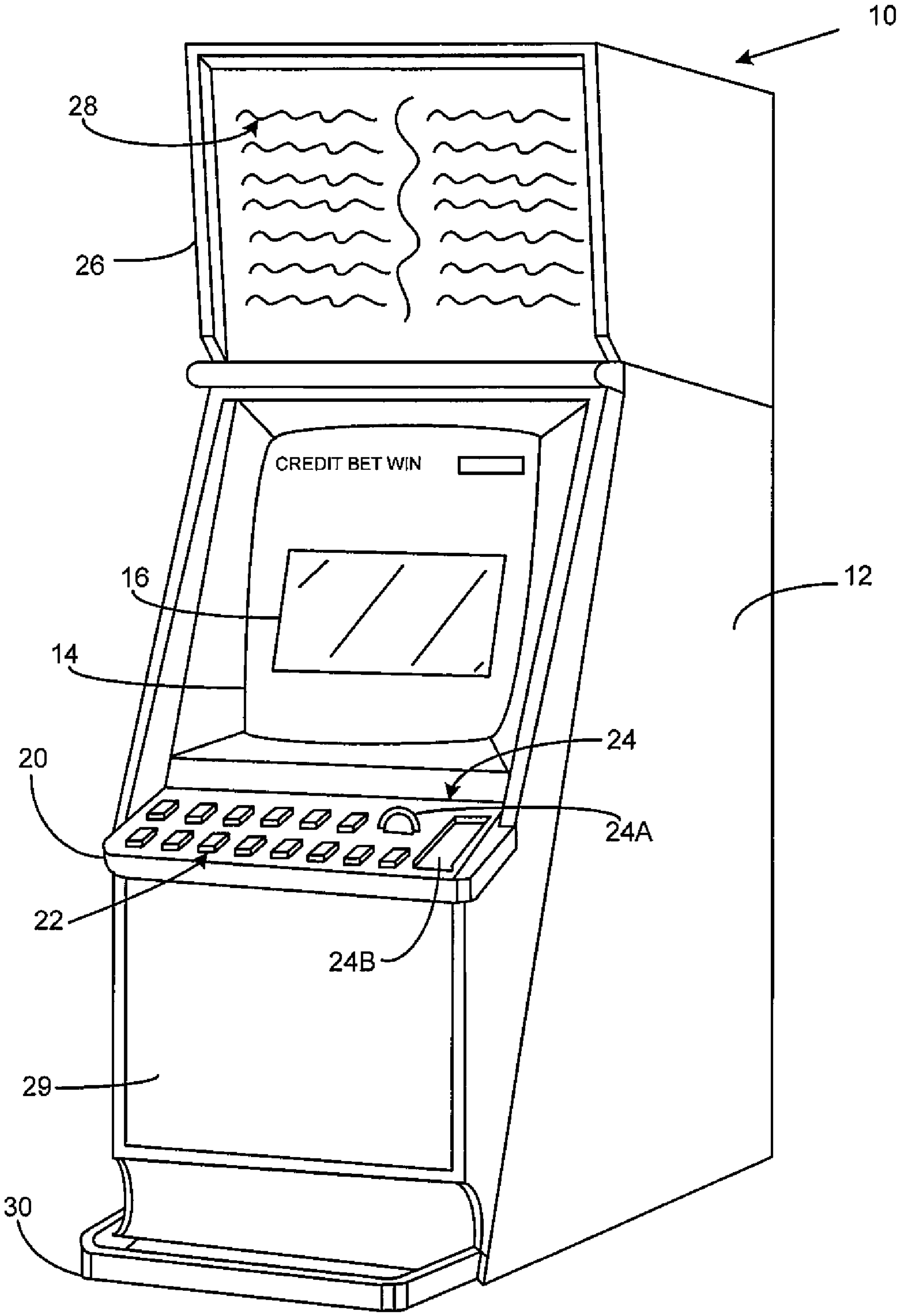
FIG. 2 is a perspective view of a gaming device in the form of a stand alone gaming machine.

A gaming device in the form of a gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may be configured for ticket in that they have a ticket reader for reading tickets having a value and crediting the player based on the face value of the ticker. As described above, a player tracking module (not shown in FIG. 1) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player tracking module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
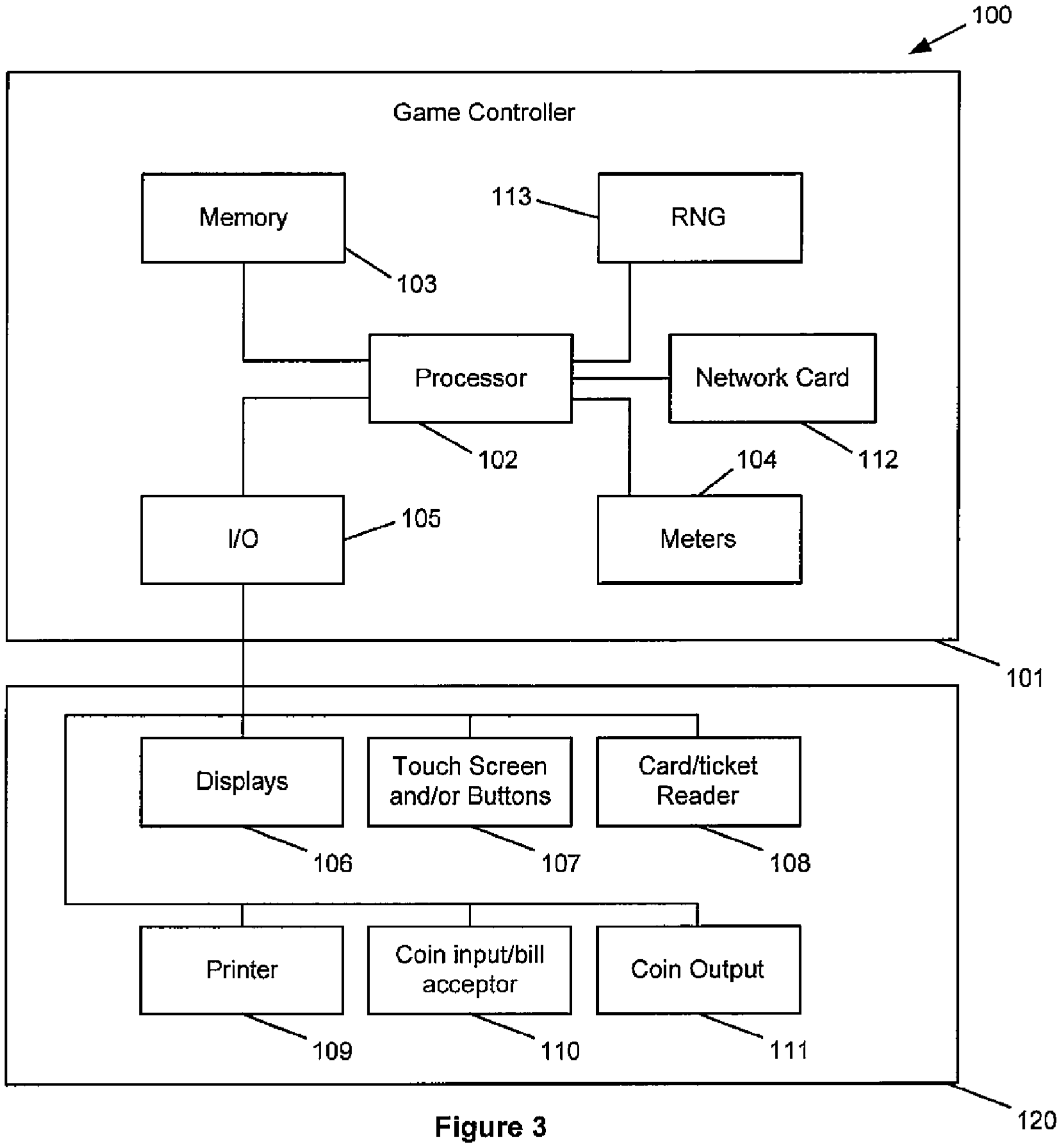
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted based on the specific implementation. For example, while buttons or touch screens are typically used in gaming machines to allow a player to place a wager and initiate a play of a game any input device that enables the player to input game play instructions may be used.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
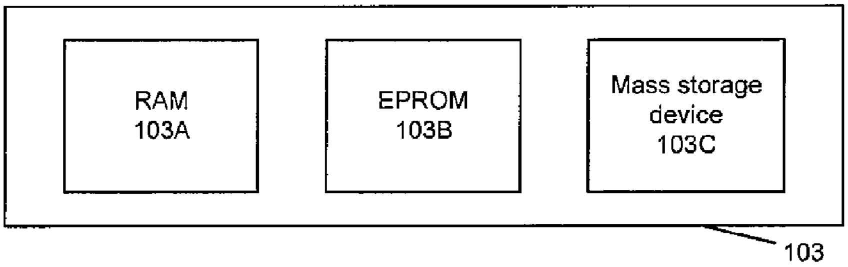
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

In a client server architecture a gaming device is provided by a gaming client and game server (and optionally other gaming network components). A gaming client has a similar outward appearance to gaming machine 10 but the game server implements most or all of the game and as such acts as the game controller while the terminal operated by the player essentially provides only the player interface. The gaming terminal receives player instructions, pass these to the game server which will process them and return game play outcomes to the gaming machine for display. Further details of a client/server gaming architecture can be found in WO 2006/052213 and PCT/SE2006/000559, the disclosures of which are incorporated herein by reference. In such an embodiment, a linked game controller can be provided, for example, by a dedicated server in data communication with the game server.

Figure 5:
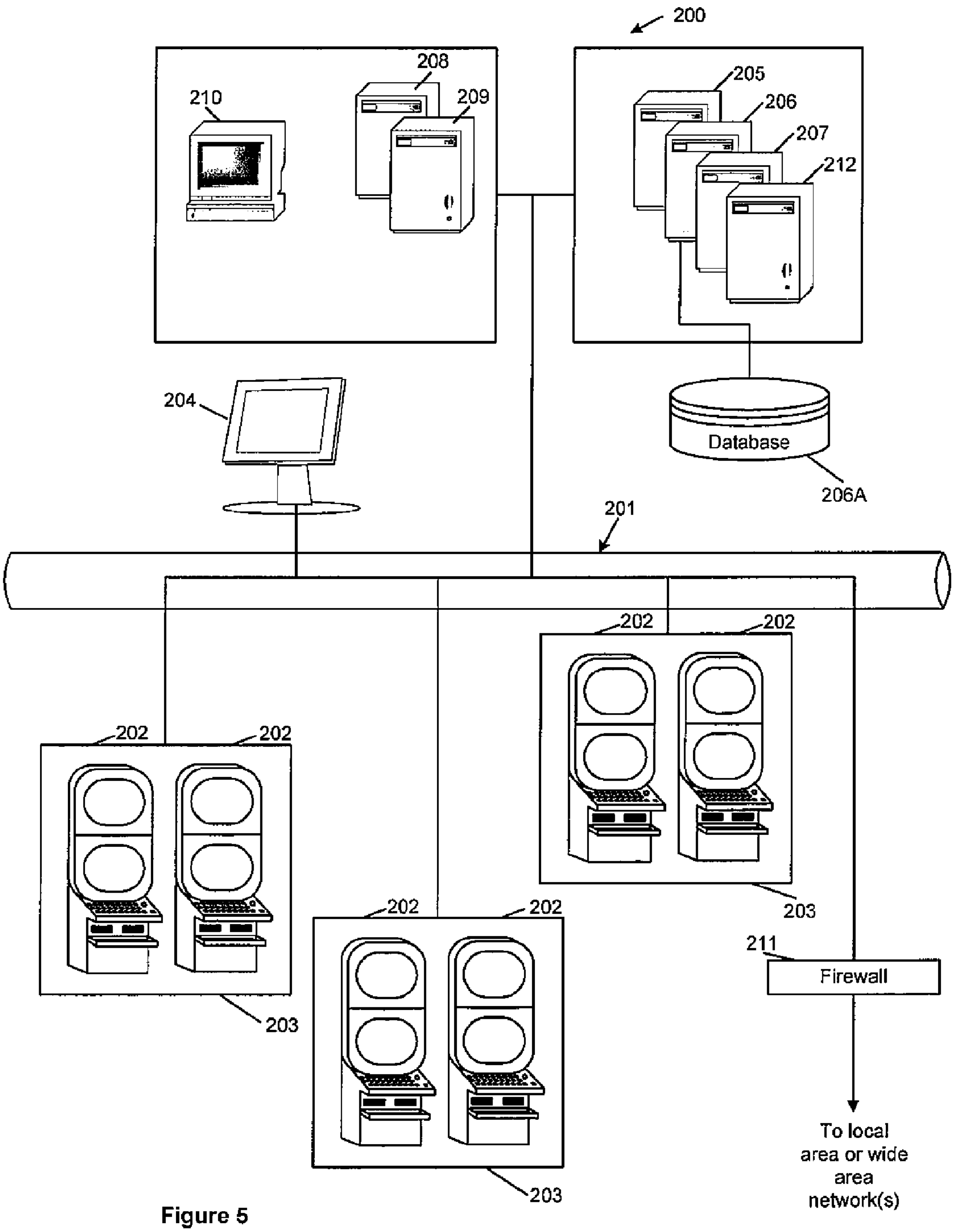
FIG. 5 is a schematic diagram of a network gaming system.

FIG. 5 shows that a gaming device may be connected within a gaming network 200 which provides additional and/or enhanced functionality. The gaming network 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

A player tracking system with a bonus controller can be provided within such a network 200 by player tracking server 205.

A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games based on the terminals.

Figure 6A:
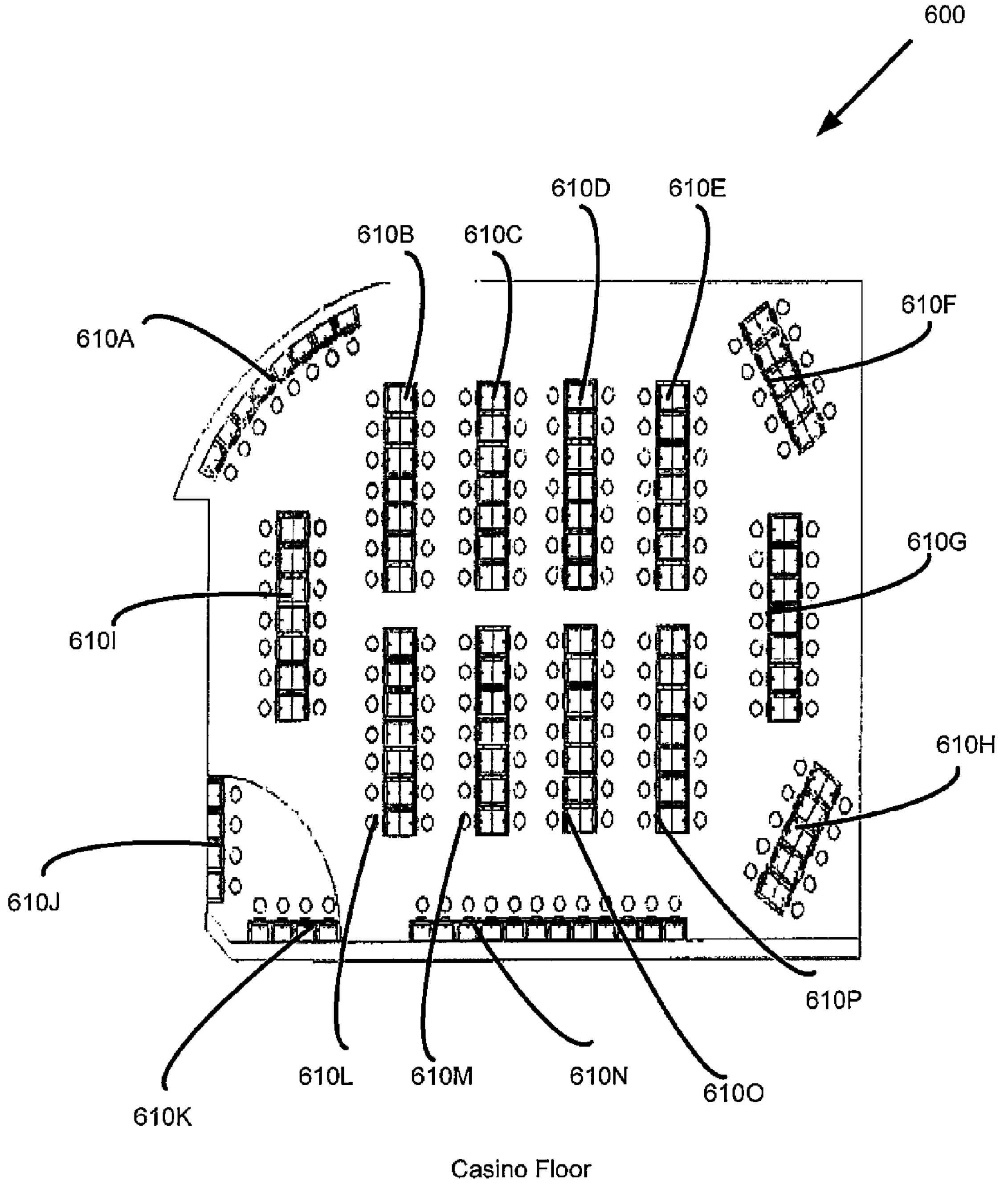
FIGS. 6A and 6B are schematic diagrams of a venue in which a bonus controller is employed.

Referring to FIG. 6, there is shown an exemplary layout 600 of a casino floor from which it will be apparent that the casino floor includes a plurality of banks 610A to 610P, each including a plurality of gaming devices, in the form of gaming machines such as slot machines, poker machines or the like. As indicated in FIG. 1, the memory 170 stores layout data 171 representative of the physical layout of the gaming machines shown in FIG. 6A.

The player tracking system 150 may be arranged to display the layout of gaming machines graphically to a user of the system, for example, a casino manager—e.g. at a user terminal. In which case, the layout data may be as shown in FIG. 6A. In other embodiments, the layout data may include co-ordinates representative of location of the gaming machines on the casino floor. For example, co-ordinates relative to a particular reference point or a defined feature of the gaming venue such as a cashier station. In some embodiments, the layout data may include both graphical data and co-ordinate data.

An operator of the player tracking system uses a terminal to establish bonus rule data 173 which defines how a bonus event can be triggered as well as how additional bonus awards are made responsive to the triggering event. In the embodiment, the user defines a plurality of radial zones of defined physical dimensions such that when a triggering event occurs, bonus awards are made to each eligible gaming device within a defined physical proximity of the position of a gaming device in respect of which the triggering event occurs. In the embodiment, the bonus controller 162 includes an initial prize awarder 710 which determines based on the bonus rule data 173 that a bonus award is to be made to one of the gaming devices on the gaming venue floor 600. The awarding of this initial bonus award triggers the award of bonuses to other eligible gaming devices.

Figure 7:
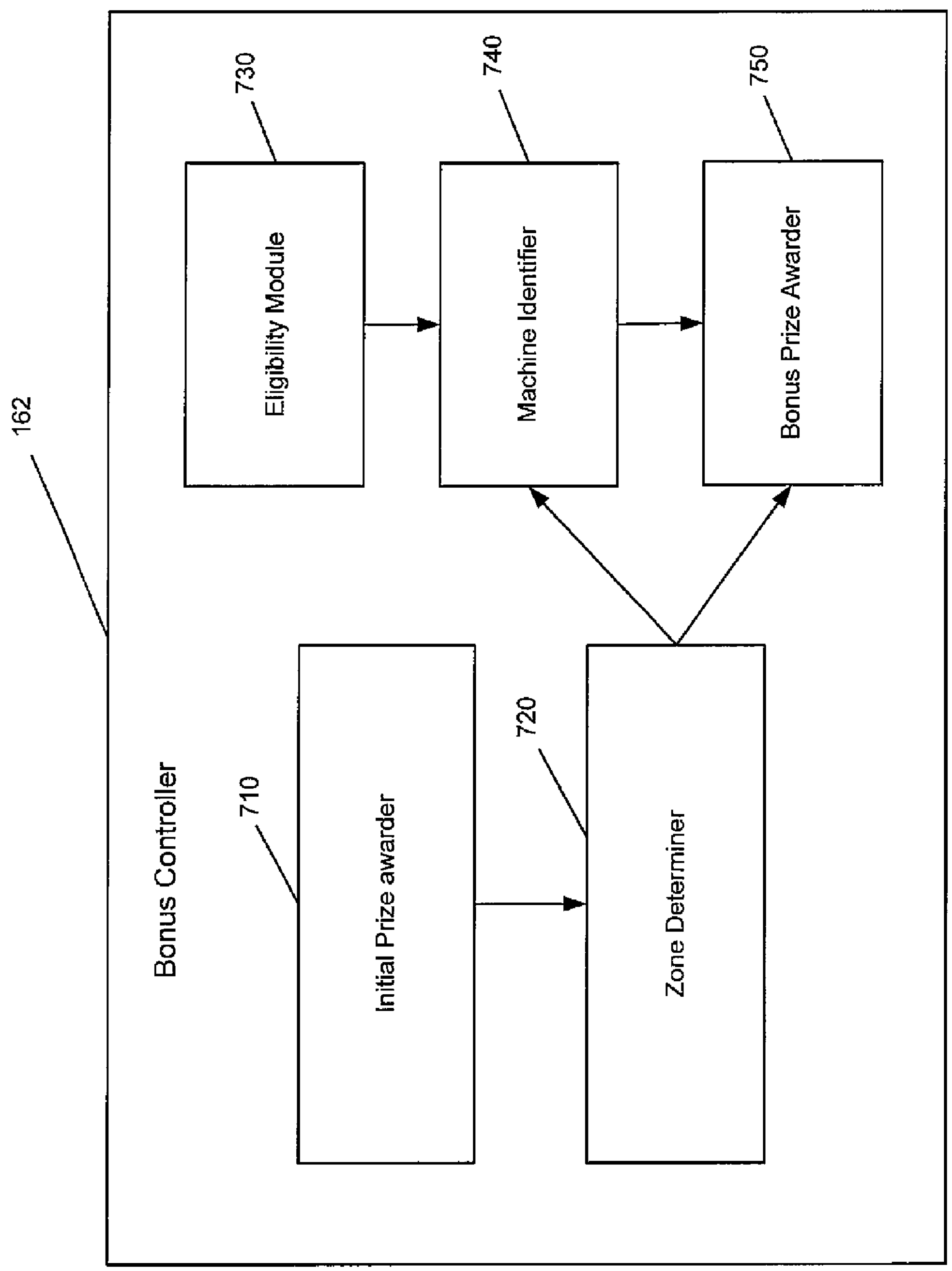
FIG. 7 is a functional block diagram of a bonus controller.

In this respect, in the embodiment, eligible gaming devices are those where a player tracking device has been presented to a player tracking module associated with the gaming device. Accordingly, as shown in FIG. 7, bonus controller 162 includes an eligibility module 730 which applies the eligibility criteria of the gaming device being active within the player tracking system based on information communicated or obtained from the player tracker 161.

Typically, the trigger for an initial prize awarder 710 awarding an initial prize to one of the gaming devices will be the fact that the player tracker 161 updates the player database 172 to reflect some criteria. For example, if the player has achieved a defined turnover criteria. Alternatively, the bonus award to the additional machines within a physical proximity of the triggering gaming device may occur as a result of a player of the particular gaming device winning a particular prize through play of the gaming device.

In other embodiments, eligibility to be awarded the bonus award may be based on a different or additional criterion. For example, to gaming devices deemed to be active within the relevant periods. For example, if the player placed a wager within the defined period prior to the initial prize awarder 710 awarding the initial prize to one of the gaming devices.

Figure 6B:
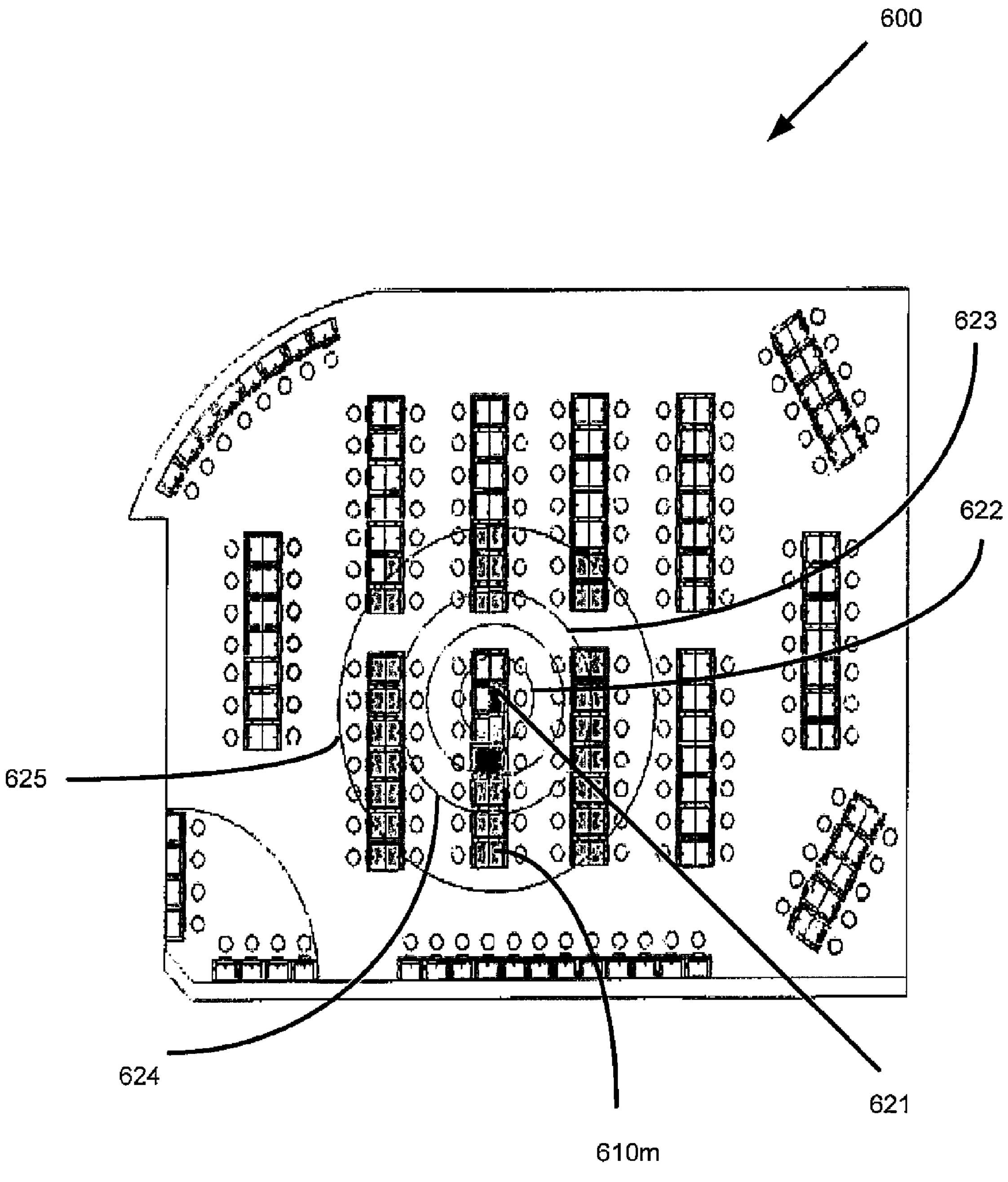

As is shown in FIG. 6B, additional bonus awards are made to gaming devices within a physical proximity of the triggering gaming device 621. In this embodiment, the triggering gaming device 621 is the second gaming machine from the top in the right hand column of the gaming machines of gaming machine bank 610M. That is, this bank contains 14 separate gaming machines arranged back to back in two columns A number of zones are defined relative to the triggering gaming device 621 namely a closest zone 622, a second closest zone 623, a third closest zone 624 and a fourth closest zone 625 each of which are based on the radial physical proximity of the gaming devices to the triggering gaming device. Accordingly, it will be appreciated that the bonus controller 720 applies the proximity rules defining the zones with the zone determiner 720 to determine machines within the proximity of the triggering gaming device. The machine identifier 740 determines which of the gaming devices within those zones are eligible based on the eligibility criteria. Different prizes are awarded based on the zones such that the closest zone 622 results in a higher bonus award than the furthest zone 625 and accordingly, based on the identified zones and the identity of the machines within zones 622 to 625, a bonus prize awarder 750 awards different prizes to different ones of the eligible machines.

Depending on the embodiment, the award may be, for example, in the form of cash, credits credited to a gaming machine, credits credited to a player loyalty account, coupons which can be redeemed from services, physical prizes, a multiplier bonus that can be applied to the gaming machine and/or to points accumulated by the player with the player tracking system 150 during the defined period.

Persons skilled in other embodiments, different techniques may be employed to identify the initial triggering device, such as it being selected at random. Further, it will be appreciated that the triggering device need not necessarily itself be awarded a prize, instead prizes could only be awarded around the triggering device.

Persons skilled in the art will appreciate the above components are the core components of a player tracking system with bonus controller but other components may be present in a bonus game controller.

Figure 8:
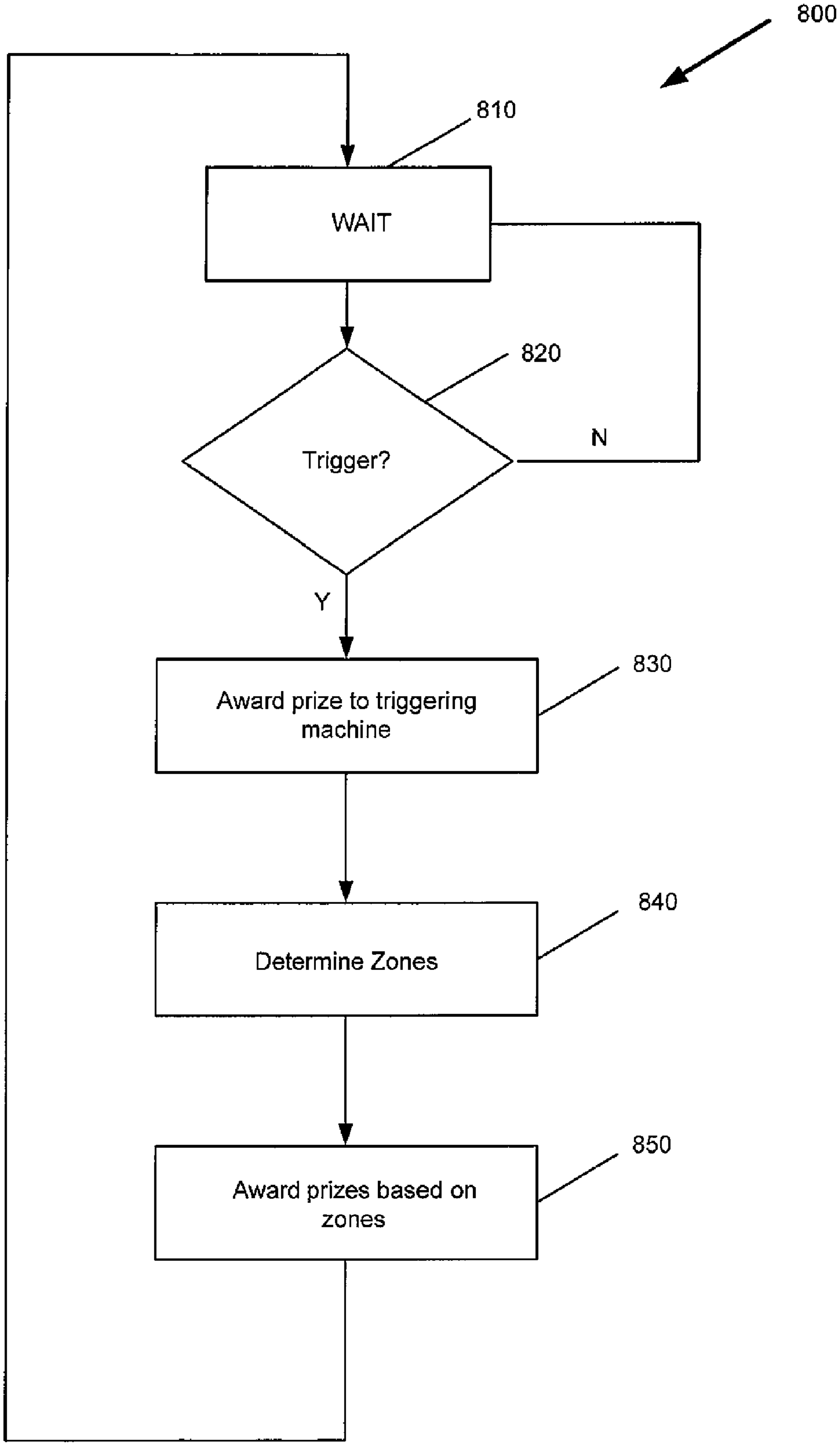
FIG. 8 is a flow chart of an embodiment.

FIG. 8 illustrates a flowchart of an example method. FIG. 8 depicts an example flow diagram representative of process(es) that may be implemented using, for example, computer readable instructions that may be used to facilitate game play and/or gaming tax management. The example process(es) of FIG. 8 may be performed using a processor, a controller and/or any other suitable processing device. For example, the example process(es) of FIG. 8 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process(es) of FIG. 8 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example process(es) of FIG. 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example process(es) of FIG. 8 may be implemented manually or as any combination(s) of any of the foregoing techniques, for example, any combination of firmware, software, discrete logic and/or hardware. Further, although example processes are described with reference to the flow diagram of FIG. 8, other methods of implementing the process(es) of FIG. 8 may be employed. For example, the order of execution of the blocks may be changed, and/or some of the blocks described may be changed, eliminated, sub-divided, or combined. Additionally, any or all of the example process(es) of FIG. 8 may be performed sequentially and/or in parallel by, for example, separate processing threads, processors, devices, discrete logic, circuits, etc.

The method 800 of the embodiment is shown in FIG. 8. Initially, the bonus controller is in a wait state 810. When a trigger condition is met 820, a prize is awarded to the triggering machine 830. It is then determined what eligible gaming devices are within a defined physical proximity of the gaming device by determining the gaming devices within the defined zones 840. Prizes are then awarded based on the zones to which eligible gaming devices belong.

Persons skilled in the art will appreciate that while it is advantageous that the zones are radially displaced annular zones relative to the triggering gaming device, other techniques could be used to define physical proximity of gaming devices to the triggering gaming device. For example, a series of squares around the triggering gaming device could define the zones.

Persons skilled in the art would appreciate prizes can vary between the zones based on the number of different rules, for example, the prizes may decrease linearly across the zones or logarithmically or be user specified for each zone.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor, for example, an application specific integrated circuit (ASIC) or a field programmable gate array (FPGA).

In the claims which follow and in the preceding description of certain embodiments of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such reference does not constitute an admission that the prior art forms a part of the common general knowledge of the art in any country.

It will be understood to persons skilled in the art of the invention that many modifications may be made without departing from the spirit and scope of the invention, in particular it will be apparent that certain features of embodiments of the invention can be employed to form further embodiments. For example, the trigger event may be, a symbol combination in a game played with a gaming device or be based on a random evaluation, etc.

Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Figure 9:
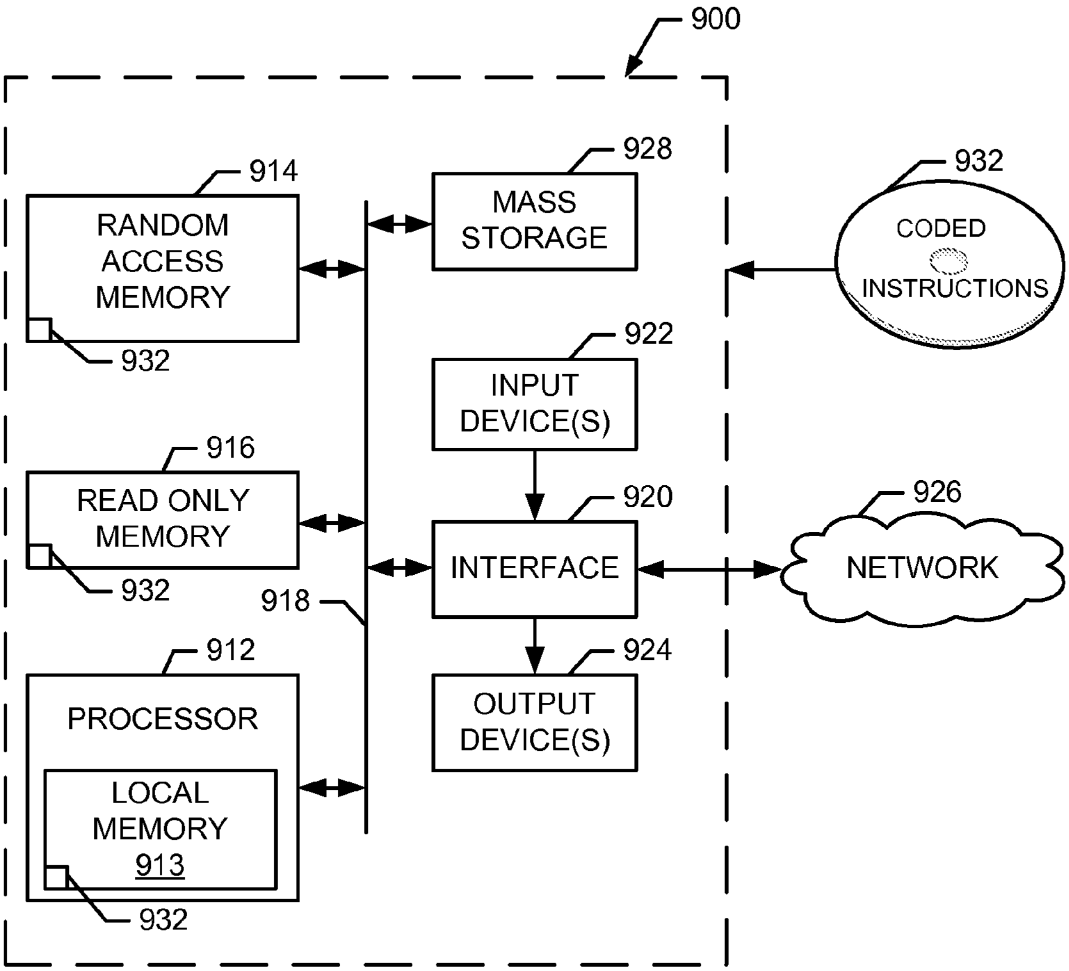
FIG. 9 is a block diagram of an example processor platform that may be used to execute computer-readable instructions to implement example systems and methods described and disclosed herein.

For example, FIG. 9 is a block diagram of an example processor platform 900 capable of executing the instructions of FIG. 8 to implement the example systems and methods disclosed and described herein. The processor platform 900 can be, for example, a server, a personal computer, an Internet appliance, a set top box, or any other type of computing device.

The processor platform 900 of the instant example includes a processor 912. For example, the processor 912 can be implemented by one or more microprocessors or controllers from any desired family or manufacturer. The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a track-pad, a trackball, isopoint and/or a voice recognition system.

One or more output devices 924 are also connected to the interface circuit 920. The output devices 924 can be implemented, for example, by display devices (e.g., a liquid crystal display, a cathode ray tube display (CRT), etc.). The interface circuit 920, thus, typically includes a graphics driver card.

The interface circuit 920 also includes a communication device such as a modem or network interface card to facilitate exchange of data with external computers via a network 926 (e.g., an Ethernet connection, a digital subscriber line (DSL), a telephone line, coaxial cable, a cellular telephone system, etc.).

The processor platform 900 also includes one or more mass storage devices 928 for storing software and data. Examples of such mass storage devices 928 include floppy disk drives, hard drive disks, compact disk drives and digital versatile disk (DVD) drives. The mass storage device 928 may implement a local storage device.

The coded instructions 932 of FIG. 8 may be stored in the mass storage device 928, in the volatile memory 914, in the non-volatile memory 916, and/or on a removable storage medium such as a CD or DVD.

The invention claimed is:

1. A bonus system for a gaming venue, the bonus system comprising:
- a plurality of gaming devices, each gaming device comprising a credit input mechanism configured to establish a credit balance, the credit balance being increasable and decreasable, and a cashout button to initiate a payout associated with the credit balance;
- a memory storing layout data representative of a two-dimensional positional layout of the plurality of gaming devices within the gaming venue; and
- a bonus controller configured to:
  - determine that a triggering event has occurred with respect to a triggering gaming device of the plurality of gaming devices;
  - define a plurality of bonus award zones according to a radial proximity to the triggering gaming device, the plurality of bonus award zones including a nearest bonus award zone and a furthest bonus award zone with respect to the triggering gaming device;

identify eligible gaming devices of the plurality of gaming devices positioned within the plurality of bonus award zones based on the two-dimensional positional layout; and award respective bonus awards to the eligible gaming devices based on within which of the plurality of bonus award zones each eligible gaming device of the eligible gaming devices is positioned, wherein a credit balance of each eligible gaming device positioned in the nearest bonus award zone is increased by a largest bonus award, and wherein a credit balance of each eligible gaming device positioned in the furthest bonus award zone is increased by a smallest bonus award.

2. A bonus system as claimed in claim 1, wherein the bonus controller is further configured to award a bonus award to the triggering gaming device, wherein the bonus award is the triggering event.

3. A bonus system as claimed in claim 2, wherein only eligible gaming devices can be triggering gaming devices.

4. A bonus system as claimed in claim 1, wherein the bonus controller is further configured to determine which of the plurality of gaming devices are the eligible gaming devices based eligibility criteria.

5. A bonus system as claimed in claim 4, wherein the eligibility criteria includes that a gaming device of the plurality of gaming devices was active within a defined period of time relative to a time of the triggering event.

6. A bonus system as claimed in claim 4, wherein the eligibility criteria includes that a player tracking system is tracking play on a gaming device of the plurality of gaming devices.

7. A bonus controller for a gaming venue, the gaming venue comprising a plurality of gaming devices, each gaming device comprising a credit input mechanism configured to establish a credit balance, the credit balance being increasable and decreasable, and a cashout button to initiate a payout associated with the credit balance, the bonus controller configured to:

determine that a triggering event has occurred with respect to a triggering gaming device of the plurality of gaming devices disposed within the gaming venue;

define a plurality of bonus award zones according to a radial proximity to the triggering gaming device, the plurality of bonus award zones including a nearest bonus award zone and a furthest bonus award zone with respect to the triggering gaming device;

identify eligible gaming devices of the plurality of gaming devices positioned within the plurality of bonus award zones based on a two-dimensional positional layout of the plurality of gaming devices in the gaming venue; and award respective bonus awards to the eligible gaming devices based on within which of the plurality of bonus award zones each eligible gaming device of the eligible gaming devices is positioned, wherein a credit balance of each eligible gaming device positioned in the nearest bonus award zone is increased by a largest bonus award, and wherein a credit balance of each eligible gaming device positioned in the furthest bonus award zone is increased by a smallest bonus award.

8. A bonus controller as claimed in claim 7, wherein the bonus controller is further configured to award a bonus award to the triggering gaming device, wherein the bonus award is the triggering event.

9. A bonus controller as claimed in claim 8, wherein only eligible gaming devices can be triggering gaming devices.

10. A bonus controller as claimed in claim 7, wherein the bonus controller is further configured to determine which of the plurality of gaming devices are the eligible gaming devices based eligibility criteria.

11. A bonus controller as claimed in claim 10, wherein the eligibility criteria includes that a gaming device of the plurality of gaming devices was active within a defined period of time relative to a time of the triggering event.

12. A bonus controller as claimed in claim 10, wherein the eligibility criteria includes that a player tracking system is tracking play on a gaming device of the plurality of gaming devices.

13. A method of making a bonus award with respect to eligible gaming devices at a gaming venue with a bonus controller, each gaming device comprising a credit input mechanism configured to establish a credit balance, the credit balance being increasable and decreasable, and a cashout button to initiate a payout associated with the credit balance, the method comprising:

determining, with the bonus controller, that a triggering event has occurred with respect to a triggering gaming device of a plurality of gaming devices disposed within the gaming venue;

defining a plurality of bonus award zones according to a radial proximity to the triggering gaming device, the plurality of bonus award zones including a nearest bonus award zone and a furthest bonus award zone with respect to the triggering gaming device;

identifying eligible gaming devices of the plurality of gaming devices positioned within the plurality of bonus award zones based on a two-dimensional positional layout of the plurality of gaming devices in the gaming venue; and awarding respective bonus awards to the eligible gaming devices based on within which of the plurality of bonus award zones each eligible gaming device of the eligible gaming devices is positioned, wherein a credit balance of each eligible gaming device positioned in the nearest bonus award zone is increased by a largest bonus award, and wherein a credit balance of each eligible gaming device positioned in the furthest bonus award zone is increased by a smallest bonus award.

14. A method as claimed in claim 13, further comprising awarding a bonus award with the bonus controller to the triggering gaming device, wherein the bonus award is the triggering event.

15. A method as claimed in claim 14, wherein only eligible gaming devices can be triggering gaming devices.

16. A method as claimed in any claim 13, further comprising determining, using the bonus controller, which of the plurality of gaming devices are the eligible gaming devices based on eligibility criteria.

17. A method as claimed in claim 16, wherein the eligibility criteria includes that a gaming device of the plurality of gaming devices was active within a defined period of time relative to a time of the triggering event.

18. A method as claimed in claim 16, wherein the eligibility criteria includes that a player tracking system is tracking play on a gaming device of the plurality of gaming devices.

19. A tangible non-transitory computer readable medium comprising computer program code that, when executed by a processor of a bonus controller, implements a method of making a bonus award with respect to eligible gaming devices at a gaming venue, each gaming device comprising a credit input mechanism configured to establish a credit balance, the credit balance being increasable and decreasable, and a cashout button to initiate a payout associated with the credit balance, the method comprising:

determining that a triggering event has occurred with respect to a triggering gaming device of a plurality of gaming devices disposed within the gaming venue;

defining a plurality of bonus award zones according to a radial proximity to the triggering gaming device, the plurality of bonus award zones including a nearest bonus award zone and a furthest bonus award zone with respect to the triggering gaming device;

identifying eligible gaming devices of the plurality of gaming devices positioned within the plurality of bonus award zones based on a two-dimensional positional layout of the plurality of gaming devices in the gaming venue; and awarding respective bonus awards to the eligible gaming devices based on within which of the plurality of bonus award zones each eligible gaming device of the eligible gaming devices is positioned, wherein a credit balance of each eligible gaming device positioned in the nearest bonus award zone is increased by a largest bonus award, and wherein a smallest bonus award is awarded to eligible gaming devices positioned in the furthest bonus award zone is increased by a smallest bonus award.

* * * * *